United States Patent [19]
Dysarz

[11] Patent Number: 5,564,670
[45] Date of Patent: Oct. 15, 1996

[54] CLEAT MOUNTED HOLDING DEVICE

[76] Inventor: Edward D. Dysarz, 11423 Triola Ln, Houston, Tex. 77072

[21] Appl. No.: 399,186

[22] Filed: Apr. 11, 1995

[51] Int. Cl.⁶ .................................................. F16M 13/00
[52] U.S. Cl. ...................... 248/515; 248/520; 248/224.7; 248/229.15
[58] Field of Search ................................... 248/514, 515, 248/520, 521, 538, 229.15, 224.8, 224.7, 231.85, 231.71

[56] References Cited

U.S. PATENT DOCUMENTS

| | | | |
|---|---|---|---|
| 1,987,842 | 1/1935 | Sampson | 248/538 |
| 2,961,209 | 11/1960 | Willey | 248/515 |
| 4,157,803 | 6/1979 | Mack | 248/538 |
| 4,614,323 | 9/1986 | Bauer | 248/515 |

*Primary Examiner*—Karen J. Chotkowski
*Assistant Examiner*—Gwendolyn Wrenn-Baxter

[57] ABSTRACT

A device that can be fixed to a cleat mounted on a boat, dock, deck, pier, or wherever a cleat is available. The U bar of the cleat mounted holding device is placed around the cleat, the wing bolt is inserted into the threaded hole formed in the short bar of the U bar and the wing bolt is tightened until the U bar compresses the cleat between the elongated bar and the short bar thus securing the U bar to the cleat; the pivot support bar is rotated to the desired direction and angle relative to the cleat. A fishing rod, or an umbrella, a lamp stand or any other desirable device is placed into the support tube.

8 Claims, 11 Drawing Sheets

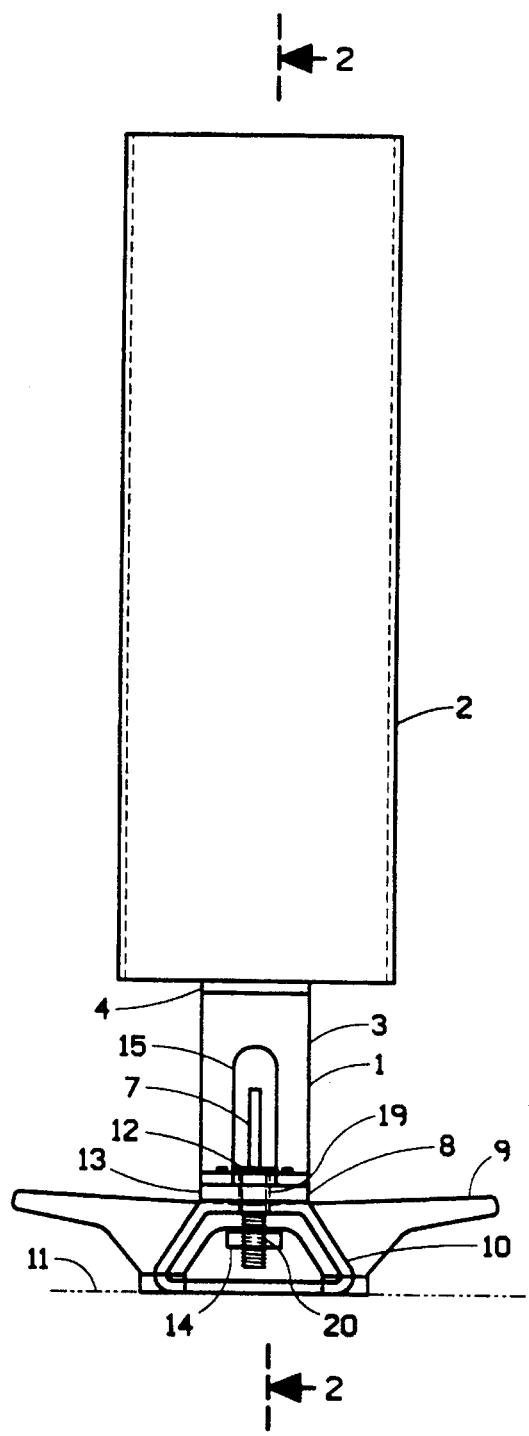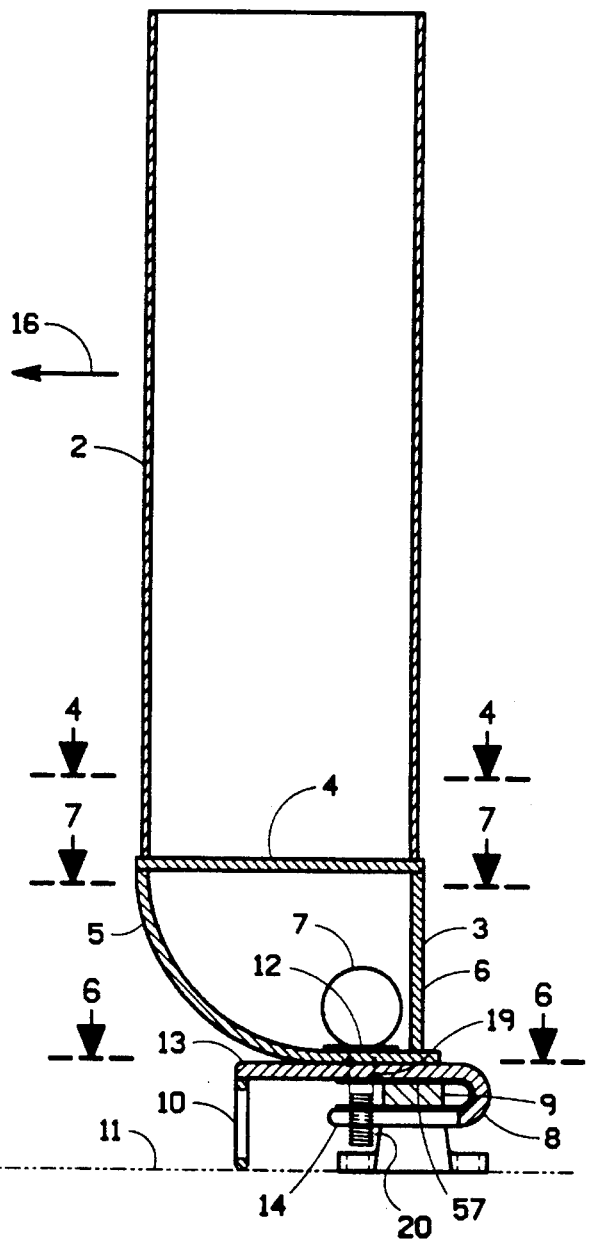
FIGURE 1
FIGURE 2

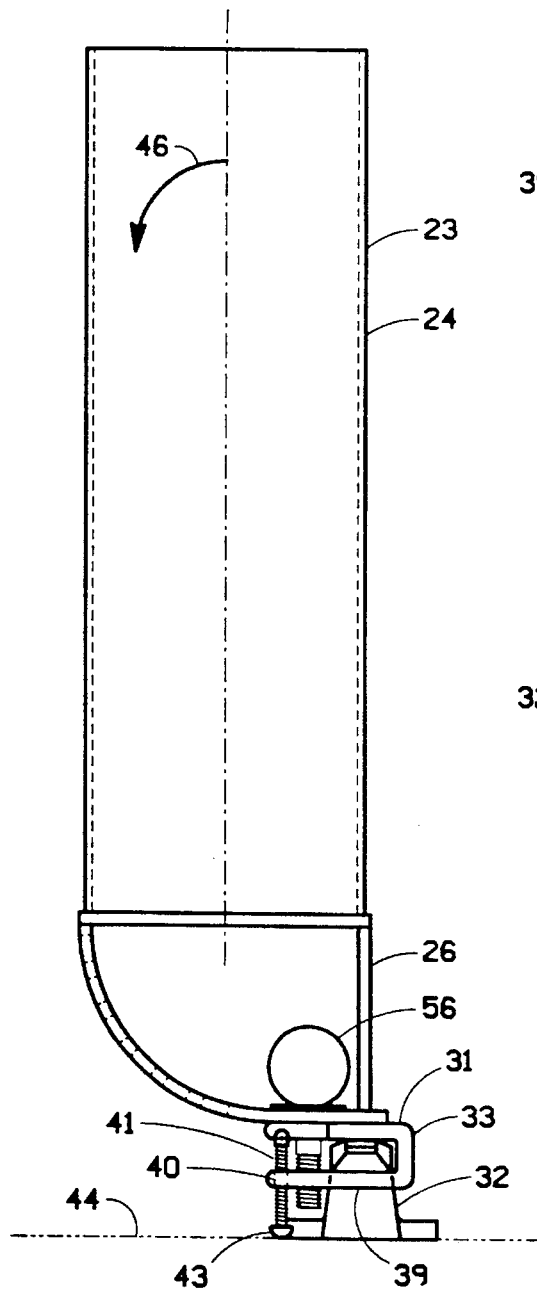
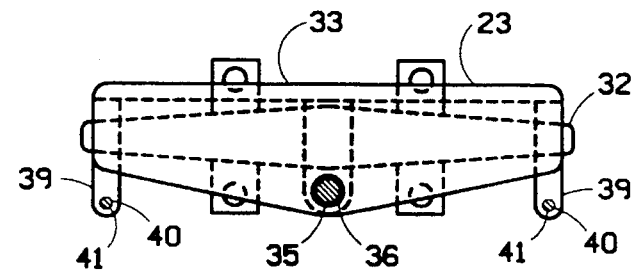
FIGURE 16
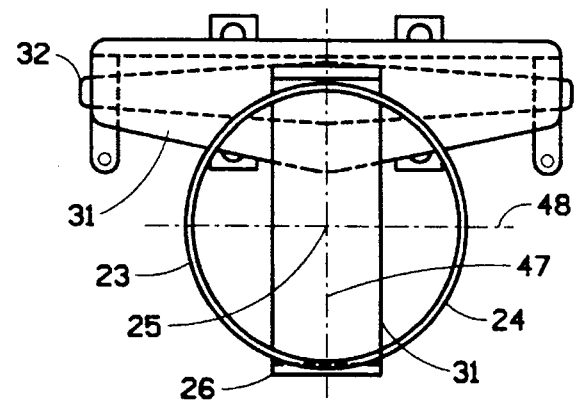
FIGURE 17
FIGURE 15

CLEAT MOUNTED HOLDING DEVICE

There are various means of mounting rod holders, lamps, grills, torches, umbrellas and other devices to a boat or some docks that may be made out of concrete but in all cases the device will have to be screwed or bolted to the boat or concrete dock. To screw or bolt a device to a boat or concrete dock, more holes will have to be drilled thereby damaging or weakening the boat or dock and further accelerating corrosion or deterioration of the material that make up the boat or dock.

There are also clamp on devices but often they too damage a boat or dock and most often there is no place on the boat or concrete dock to clamp the clamp on device to.

When using the cleat mounted device of this invention, the device is clamped to an existing cleat on the boat wherein the cleat is placed on the boat by the manufacturer of the boat and the area where the cleat is mounted, is usually reinforced to withstand greater forces such as towing or docking a boat. The same holds true for concrete docks.

SUMMARY

It is the object of the present invention to make a satisfactory holding device that can easily be clamped to a cleat on a boat or dock.

It is still another object of the present invention to make a satisfactory holding device that could be suitably mounted to a boat or a dock without making any additional screw or bolt holes in the boat or dock.

The features of the present invention can be best understood with further objects and advantages by reference to the following descriptions taken in conjunction with accompanying drawings wherein like numerals indicate like parts.

BRIEF DESCRIPTION OF THE DRAWINGS

FIG. 1 is an elevation view of the Cleat Mounted Holding Device mounted on a cleat.

FIG. 2 is a section elevation view of the Cleat Mounted Holding Device as taken through FIG. 1.

FIG. 15 is a side elevation of the device.

FIG. 16 is a section plan view of the device of the second preferred embodiment as taken through FIG. 13.

FIG. 17 is a plan view of the second device of the preferred embodiment.

DETAILED DESCRIPTION OF THE PREFERRED EMBODIMENT

Figure 3:
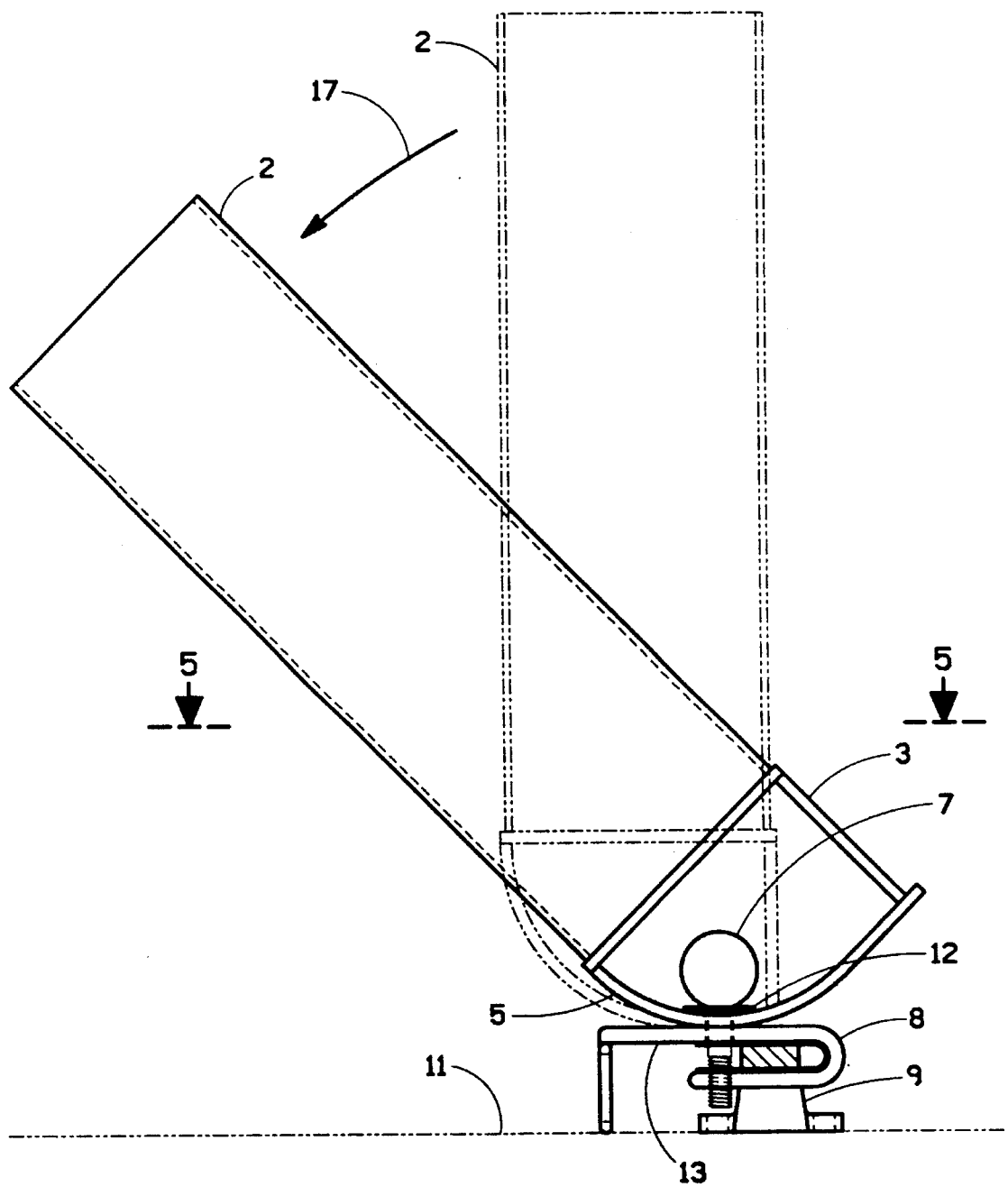
FIG. 3 is a section elevation showing the device rotated to the angle.

Referring to FIG. 1 is shown the device 1 with a tube 2. The tube 2 has a first end and a second end. The second end of the tube 2 is shown suitably fixed to the first side 4 of the pivot support 3. The pivot support 3 is shown mounted on the U bar 8 and the pivot support 3 is further shown suitably fixed to the U bar 8 by the wing bolt 7 that extends through the pivot support slot 15 formed in the pivot support and the second hole 19 formed in the elongated bar 13 of the U bar 8, the threaded hole formed in the short bar 14 and the wing bolt washer 12. The U bar 8 is shown disposed about the cleat 9 which is shown more clearly in FIG. 2. The cleat 9 is shown suitably fixed to the boat 11 or dock. The U bar support 10 is shown fixed to the U bar 8 and will also be seen more clearly in FIG. 2.

Referring to FIG. 2 there is shown a section elevation as taken through FIG. 1. The device is shown fixed over the top of the cleat 9

The second end of the tube 2 is shown suitably fixed to the first side 4 of the pivot support 3. The pivot support 3 is shown with a first side 4, a curved second side 5 and a third side 6. The pivot support 3 is held or fixed to the U bar 8 by a wing bolt 7 and a wing bolt washer 12. The wing bolt 7 is shown threaded on the lower end and is disposed through the second hole 19 formed in the elongated bar 13 of the U bar 8 and extends into the threaded hole 20 of the short bar 14 of the U bar 8. The second hole 19 formed in the elongated bar 13 is greater in diameter than the shaft of the wing bolt 7. The threaded hole 20 formed in the short bar 14 of the U bar 8 has the same thread size as the wing bolt 7 and the suitably diameter to allow the threads of the wing bolt 7 to mesh and correspond to threads of the threaded hole 20 formed in the short bar 14. When the U bar 8 is disposed around, or over and under the cleat 9 the wing bolt is inserted through the pivot support slot, through the second hole 19 formed in the elongated bar 13 and through the threaded hole 20 formed in the short bar 14 where the wing bolt 7 is tightened thus pulling up on the short bar 14 and compressing the cleat 9 between the elongated bar 13 and the short bar 14. A soft pad 57 is also shown between the elongated bar 13 and the short bar 14 of the U bar 8, and the cleat 9 to prevent damage to the surface of the cleat 9 as the U bar 8 is tightened around the cleat 9.

When stress is placed on the tube 2 in an outboard direction 16, the U bar support 10 takes some of the vertical and rotational stress from the cleat 9 and transfers it into the boat 11 or dock not shown. A U bar support 10 may also be added to the other side of the U bar 8 By design choice. A soft pad made out of rubber or other soft material may be added between the U bar support 8 and the boat deck or dock surface to further prevent scratching or other damage. The curved second side 5 could be serrated or have gear teeth that would correspond with gear teeth on the upper end of the U bar 8 or there could be a course finish on the upper end of the U bar 8 and the outside of the curved second side 5 to prevent the pivot support 3 from pivoting or rotating about the wing bolt 7, after the wing bolt 7 has been tightened. The wing bolt 7 is shown with a partially threaded shaft on the second end and a winged head on the first end to allow for gripping with fingers and thumb.

Referring to FIG. 3 there is shown a section elevation of the tube 2 and the pivot support 3 as it would rotate 17 about the wing bolt 7 and the U bar 8. The tube 2 and pivot support 3 would rotate 17 at least 90° from vertical to horizontal relative to the cleat 9, the boat 11 or the dock not shown. This rotation could be accomplished by loosening the wing bolt 7 and wing bolt washer 12, and then rotate the tube 2 to the desired angle and then tighten the wing bolt 7 and wing bolt washer 12 and further compressing the wing bolt washer 12 into the inside of the curved second side 5, further compressing the outside of the curved second side 5 into the upper side of the U bar 8. The means of pivoting the tube 2 will be shown in FIG. 8 and 9.

Figure 4:
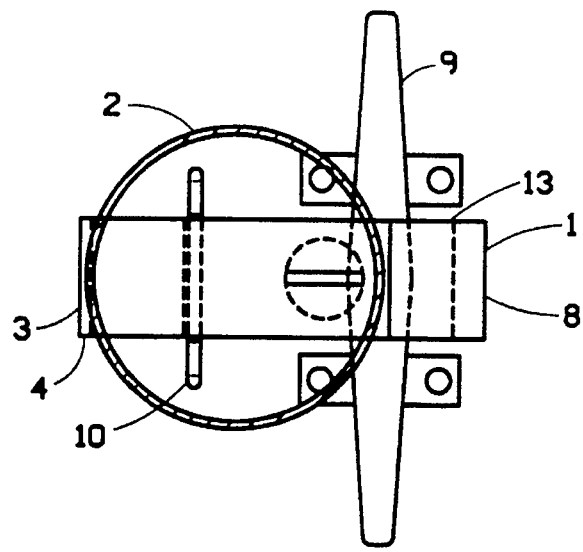
FIG. 4 is a section plan view as taken through FIG. 2.

Referring to FIG. 4 there is shown a section plan view of the device 1 as taken through FIG. 2. The device is shown fastened to a cleat 9.

The elongated bar 13 is shown on one side and it is partially covered by the pivot support 3. The tube 2 is shown above the first side 4 of the pivot support 3. The U bar support 10 is shown below the tube 2 and the elongated bar 13 of the U bar.

Figure 5:
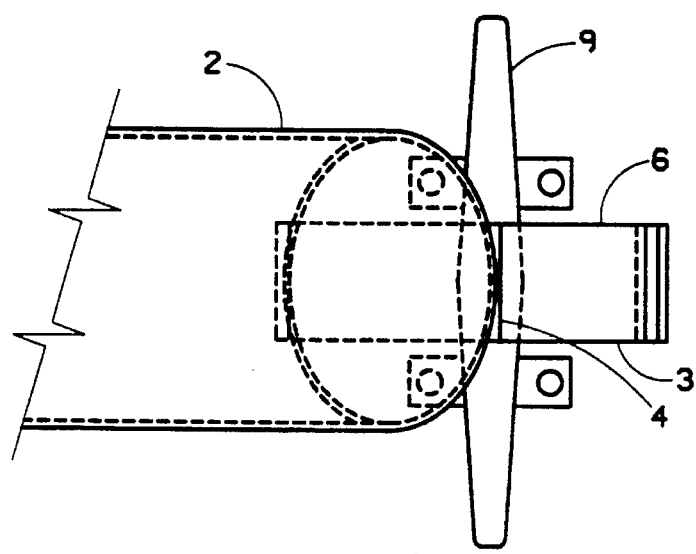
FIG. 5 is a section plan view as taken through FIG. 3.

Referring to FIG. 5 there is shown a section elevation as taken through FIG. 3. The tube 2 is shown sloping or rotated. The cleat 9 is shown as a reference to the sloping tube 2. The pivot support 3 is shown below the tube 2. Part of the first side 4 is shown, and part of the third side 6 of the pivot support 3 is shown.

Figure 6:
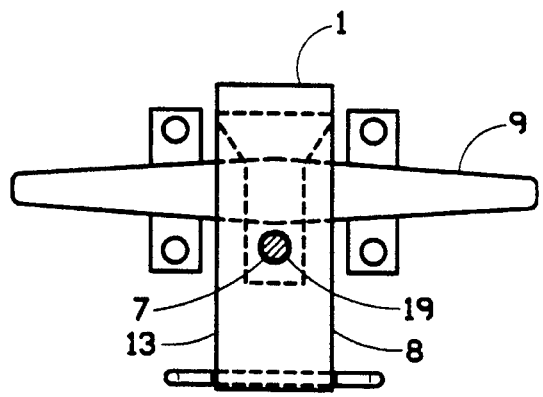
FIG. 6 is a section plan view of the device as taken through FIG. 2.

Referring to FIG. 6 there is shown a section plan view of the device as taken through FIG. 2.

The tube is not shown. The cleat 9 is shown for reference. The wing bolt 7 is shown extending through the second hole 19 formed in the elongated bar 13 of the U bar 8.

Figure 7:
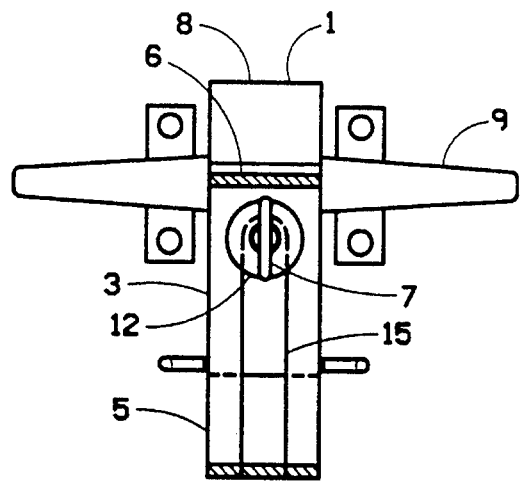
FIG. 7 is a section plan view of the device as taken through FIG. 2.

Referring to FIG. 7 there is shown another section plan as taken through FIG. 2.

The device 1 is shown fastened to the cleat 9. The wing bolt 7 is shown in the pivot support slot 15. The wing bolt washer 12 is shown below the head of the wing bolt 7. The pivot support slot 15 is shown formed in the curved second side 5 of the pivot support 3. The third side 6 of the pivot support 3 is shown above the cleat 9. A part of the U bar 8 is shown on one side of the device 1.

Figure 8:
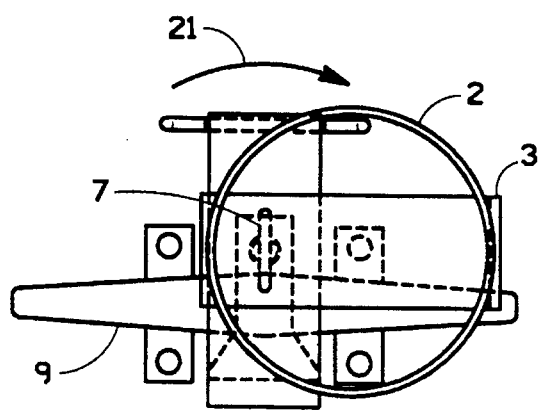
FIG. 8 is a plan view of the device rotated to the right side of the cleat.

Referring to FIG. 8 there is shown a plan view of the tube 2 that is pivoted to the right 21 side of the cleat 9.

The wing bolt is loosened and the pivot support 3 and the tube 2 are pivoted to the right 21 side of the cleat 9. When the tube 2 is pivoted to the right 21 or to the desired location the wing bolt 7 is tightened thus holding the pivot support 3 in the desired location.

Figure 9:
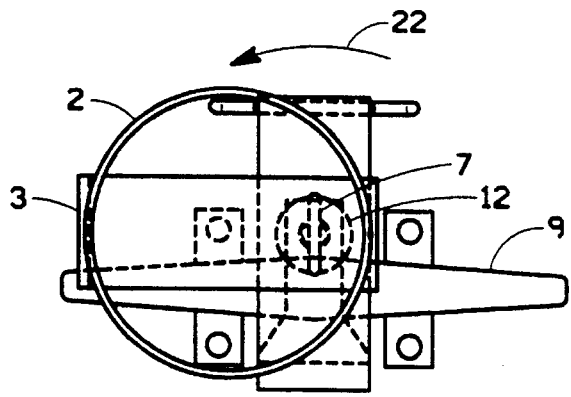
FIG. 9 is a plan view of the device rotated to the left side of the cleat.

Referring to FIG. 9 there is shown a plan view of the tube 2 and the pivot support 3 to the left 22 side of the cleat 9.

The wing bolt is loosened and the pivot support 3 and the tube 2 are pivoted to the left 22 side of the cleat 9. When the tube 2 is pivoted to the left 22 or to the desired location the wing bolt 7 and wing bolt washer 12 are tightened thus holding the pivot support 3 in the desired location.

Figure 10:
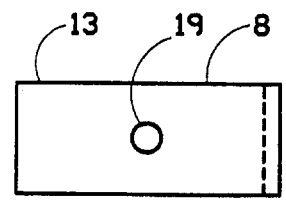
FIG. 10 is a plan view of the U bar.

Referring to FIG. 10 there is shown a plan view of the U bar 8.

The second hole 19 is shown formed in the U bar 8 and the second hole 19 extends from the first side to the second side of the elongated bar 13 of the U bar 8. The second hole 19 is a greater diameter than the diameter of the wing bolt 7.

Figure 11:
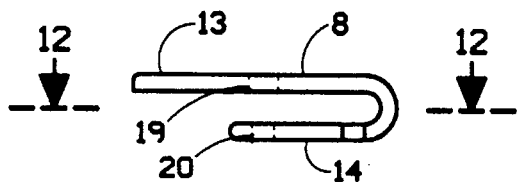
FIG. 11 is a side elevation of the U bar.

Referring to FIG. 11 there is shown a side view of the U bar 8.

The elongated bar 13 is shown above the short bar 14. The second hole 19 and the threaded hole 20 are shown in hidden lines and are in alignment with each other.

Figure 12:
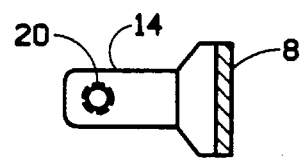
FIG. 12 is a section plan view of the U bar as taken through FIG. 11.

Referring to FIG. 12 there is shown a section plan view of the short bar 14 of the U bar 8.

The threaded hole 20 is shown formed in the short bar 14 and extends from the first side of the short bar 14 to the second side of the short bar 14. The threaded hole 20 is threaded wherein the threads formed in the threaded hole 20 will mesh or correspond to the threads formed on the wing bolt and the diameter of the threaded hole could be only slightly greater than the diameter of the wing bolt. The short bar 14 has tapers 58 on each side to allow the short bar 14 to be sufficiently narrow to suitably fit into the cleat.

Figures 13, 14:
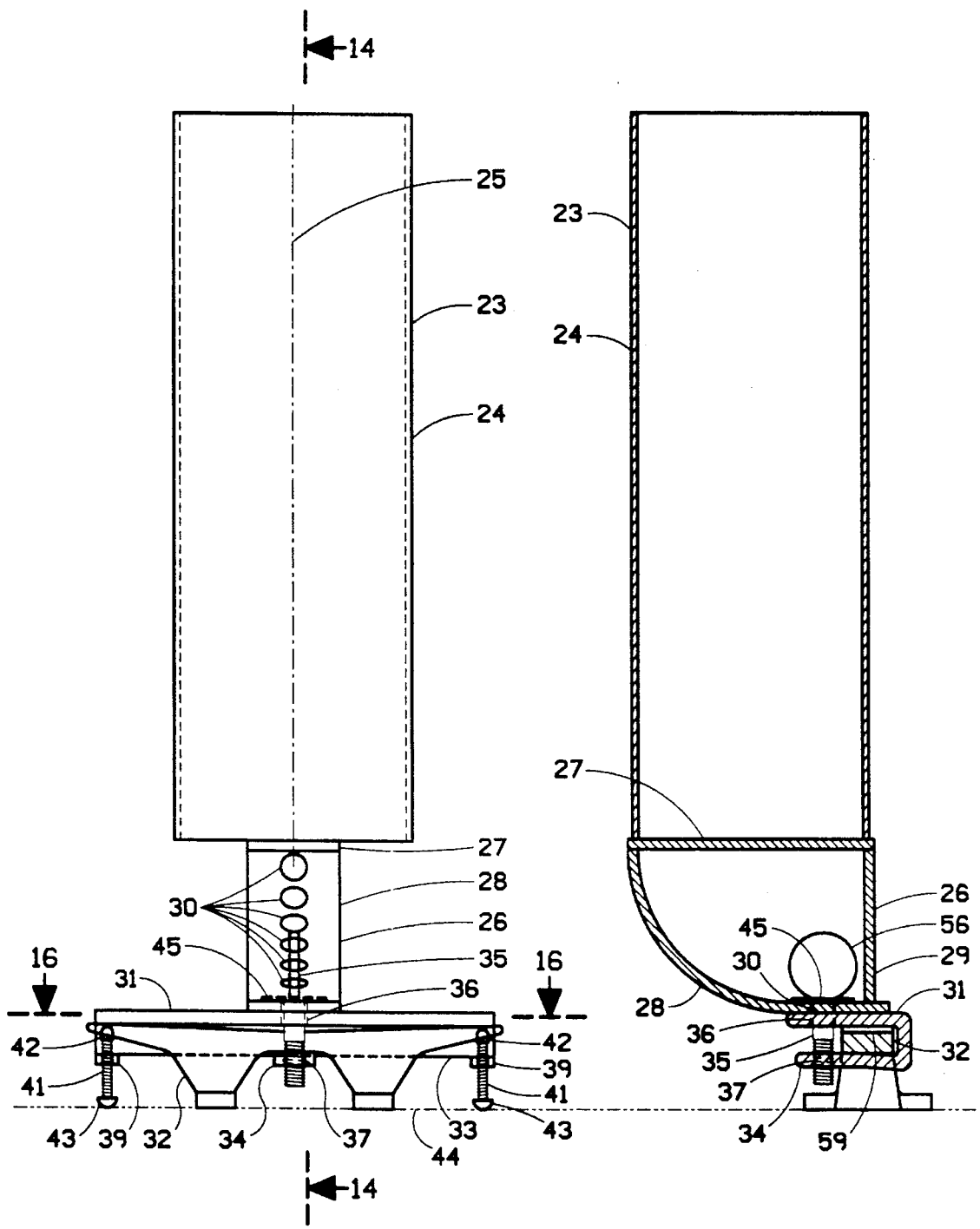
FIG. 13 is an elevation of a second preferred embodiment of the invention.
FIG. 14 is a section plan view as taken through FIG. 10.

Referring to FIG. 13 there is shown an elevation view of the second device 23 of the second preferred embodiment.

The second device 23 has an elongated tube 24 with a first end and a second end and an inside and an outside and a center line 25 that extends from the first end of the elongated tube 4 to the second end of the elongated tube 24 wherein the center line 25 is in the center of the elongated tube 24. The pivot support 26 is shown with a first side 27, a curved second side 28 and a third side 29. The first side 27 is shown suitably fixed to the second end of the elongated tube 24.

Adjustment holes 30 are shown formed in the curved second side 28 of the pivot support 26. The upper plate 31 has a 15 first end, a second end, a third end and a fourth end and is shown covering most of the cleat 32. The back plate 33 has a first end, a second end, a third end and a fourth end that covers almost the entire side of the cleat 32 thus preventing the second device 23 from rotating about the cleat 32. The cleat locking bar 34 is shown below the center of the cleat 32. The wing bolt 35 extends through the wing bolt washer 45 and is disposed in one of the adjustment holes 30 of the curved second side 28. The first hole 36 is shown formed in the upper plate 31 and the second hole 37 is shown formed in the cleat locking bar 34. The first hole 36 is a greater diameter than the wing bolt 35 and the second hole 37 is threaded with a suitable thread size and diameter to allow the wing bolt 35 and wing bolt threads to mesh with the threads in the second hole 37.

The adjustment support bars 39 are shown on the first end and the second end of the back plate 33. The adjustment support bars 39 are suitably fixed to the back plate 33 by welding, adhesive or other suitable means. The threaded support rods 41 are shown disposed through the adjustment support bars 39. The threaded holes are formed in the adjustment support bars 39 and will mesh with the threads on the threaded support rods 41. The threaded support rods 41 are shown with knobs 42 at the first end to allow the threaded support rods 41 to be gripped and turned to allow the threaded support rods 41 to be adjusted. The threaded support rods 41 further have pads 43 at the second end to prevent the threaded support rods 41 from damaging the boat 44 or deck or dock not shown. The threaded support rods 41 further prevent the second device 23 from rotating about the cleat 32.

Referring to FIG. 14 there is shown a section elevation of the second device 23 as taken through FIG. 13.

The elongated tube 24 is shown with a first end and a second end. The second end of the elongated tube 24 is shown suitably fixed to the first side 27 of the pivot support 26. The first side 27 of the pivot support 26 is shown suitably fixed to the curved second side 28 and the third side 29. The pivot support 26 is rigidly held to the upper plate 31 by a wing bolt 35 and a washer 45. The wing bolt 35 extends through the adjustment holes formed in the pivot support and further extends through a first hole 36 formed in the upper plate 31 and the wing bolt 35 further extends into and is disposed within the second hole 37 formed in the cleat locking bar 34 wherein the second hole 37 is threaded and the threads mesh with the threads formed on the second end of the wing bolt 35. When the wing bolt 35 is tightened by turning the wing gripper 56 on the first end of the wing bolt 35, the shaft of the wing bolt 35 rotates in the adjustment hole 30 and the first hole 36 freely; when the shaft on the second end of the wing bolt is turned in the proper direction, the threads on the shaft of the wing bolt 35 suitably mesh with the threads formed in the second hole 37 and pull up on the cleat locking bar 34 and squeeze the cleat 32 between the lower side of the upper plate 31 and the upper side of the cleat locking bar 34 thus locking the second device 23 to the cleat 32. A soft pad 59 is shown between the cleat 32 and the locking bar 34 to prevent damage to the cleat 32.

Referring to FIG. 15 there is shown a side elevation of the second device 23.

The elongated tube 24 is shown suitably fixed to the pivot support 26. The pivot support 26 is shown suitably fixed to the upper plate 31 and the back plate 33. The upper plate 31 and the back plate 33 are shown on the top and on one side of the cleat 32.

An adjustment support bar 39 is shown suitably fixed to the back plate 33 and the threaded support rod 41 is shown disposed within the threaded hole 40 formed in the adjustment support bar 39. The threaded support rod 41 has been turned until the pad 43 is pushing on the boat 44 thus preventing the second device 23 from rotating 46 when a fish is pulling on a fishing rod not shown being held by the second device 23.

Referring to FIG. 16 there is shown a section plan view of the second device 23 on a cleat 32.

The adjustment support bars 39 are shown extending from the back plate 33. The threaded support rods 41 are shown disposed in the threaded holes 40 formed in the adjustment support bars 39.

The shaft of the wing bolt 35 is seen in the first hole 36. The first hole 36 formed in the upper plate 31 is greater in diameter than the shaft of the wing bolt 35.

Referring to FIG. 17 there is shown a plan view of the second device 23 on a cleat 32.

The elongated tube 24 is shown as a cylinder with an inside wall and an outside wall and a center line 25 formed by a first center line 47 and a second center line 48. The elongated tube 24 is shown fixed to the pivot support 26 which can pivot as the first device. The pivot support 26 is shown above the upper plate 31 and the upper plate 31 is shown above the cleat 32.

Figure 18:
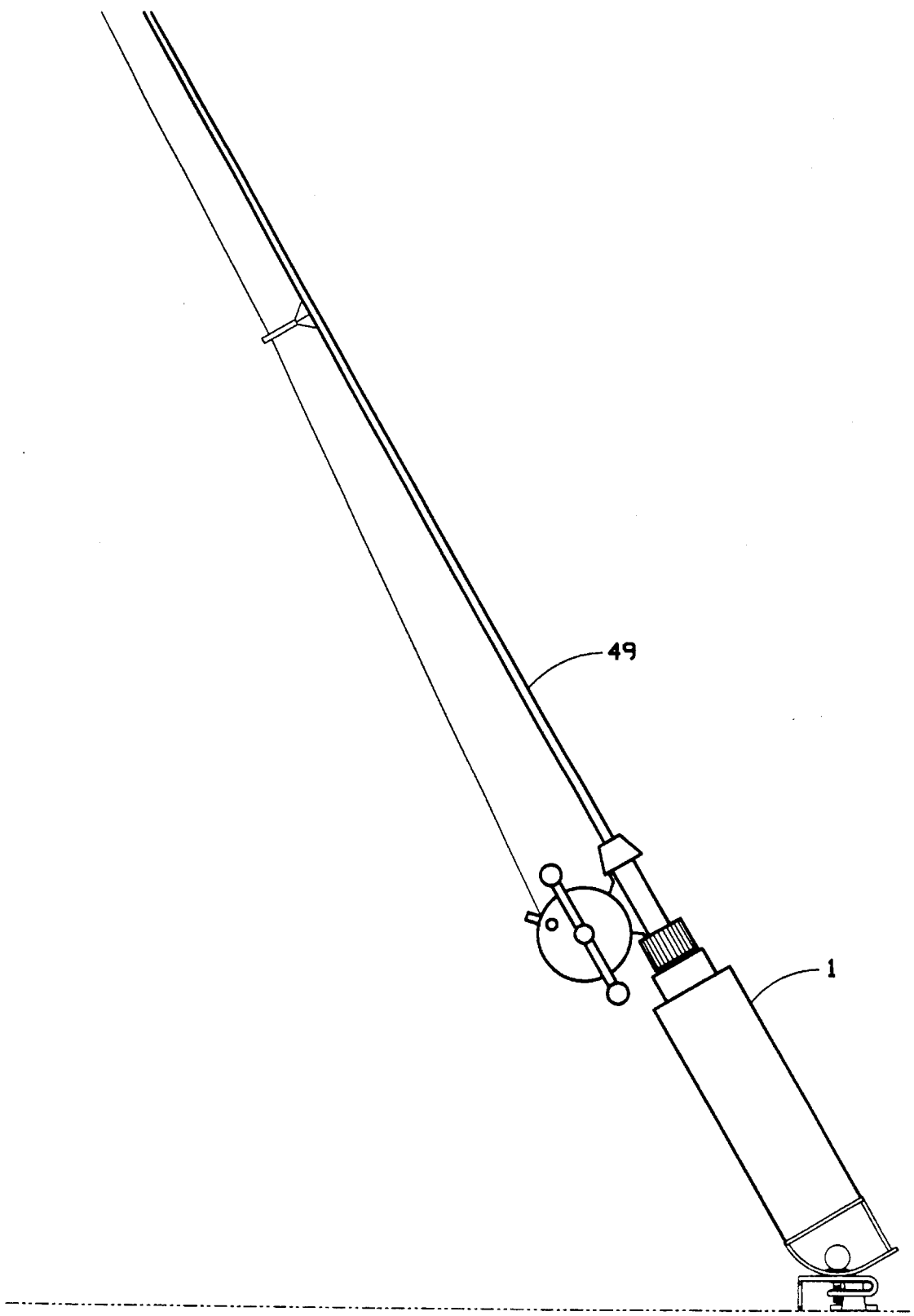
FIG. 18 is an elevation view of the device holding a fishing rod.

Referring to FIG. 18 there is shown an elevation view of the device 1 holding a fishing rod 49.

Figure 19:
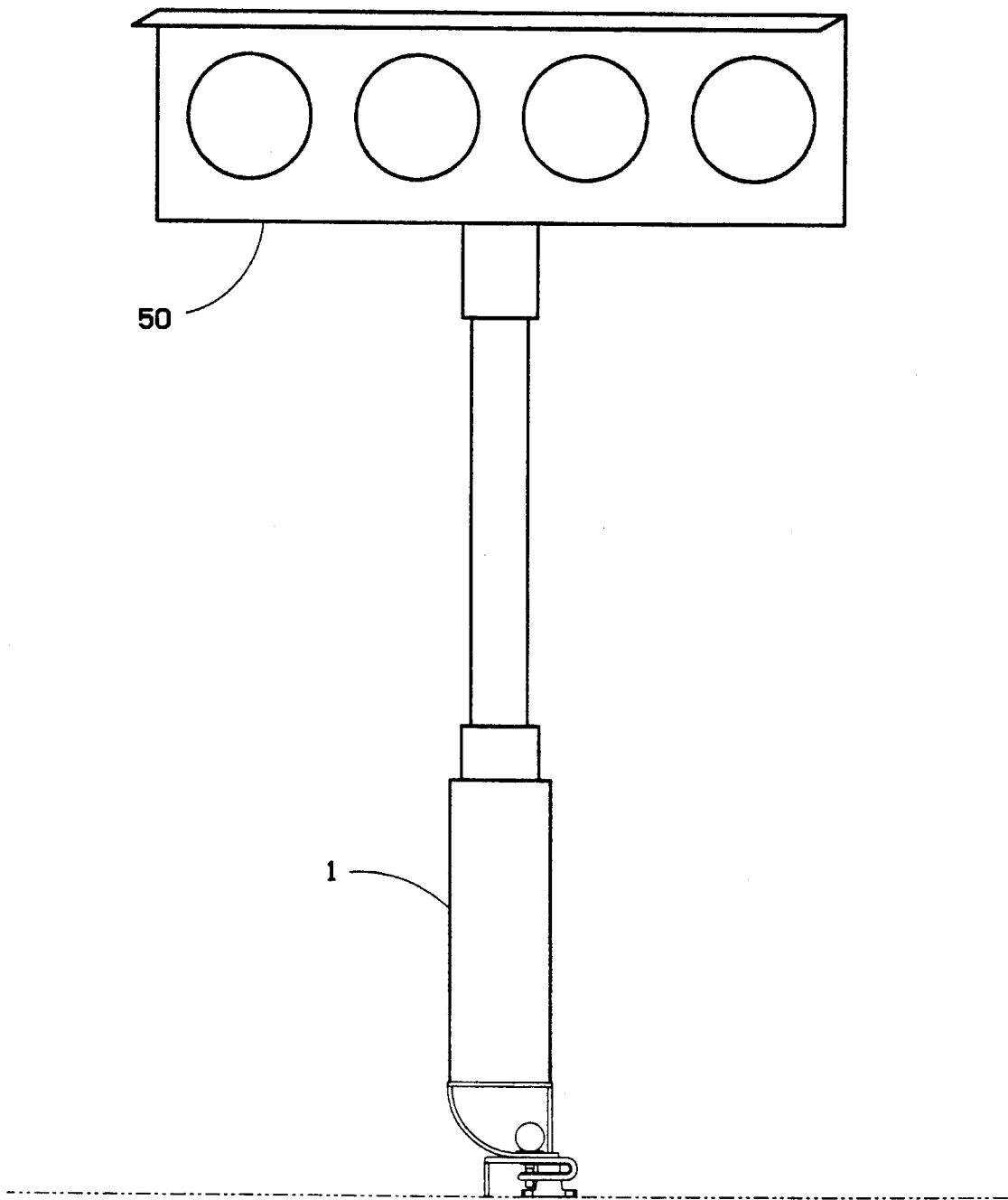
FIG. 19 is an elevation view of the device holding a lamp.

Referring to FIG. 19 there is shown an elevation view of the device holding a lamp 50.

Figure 20:
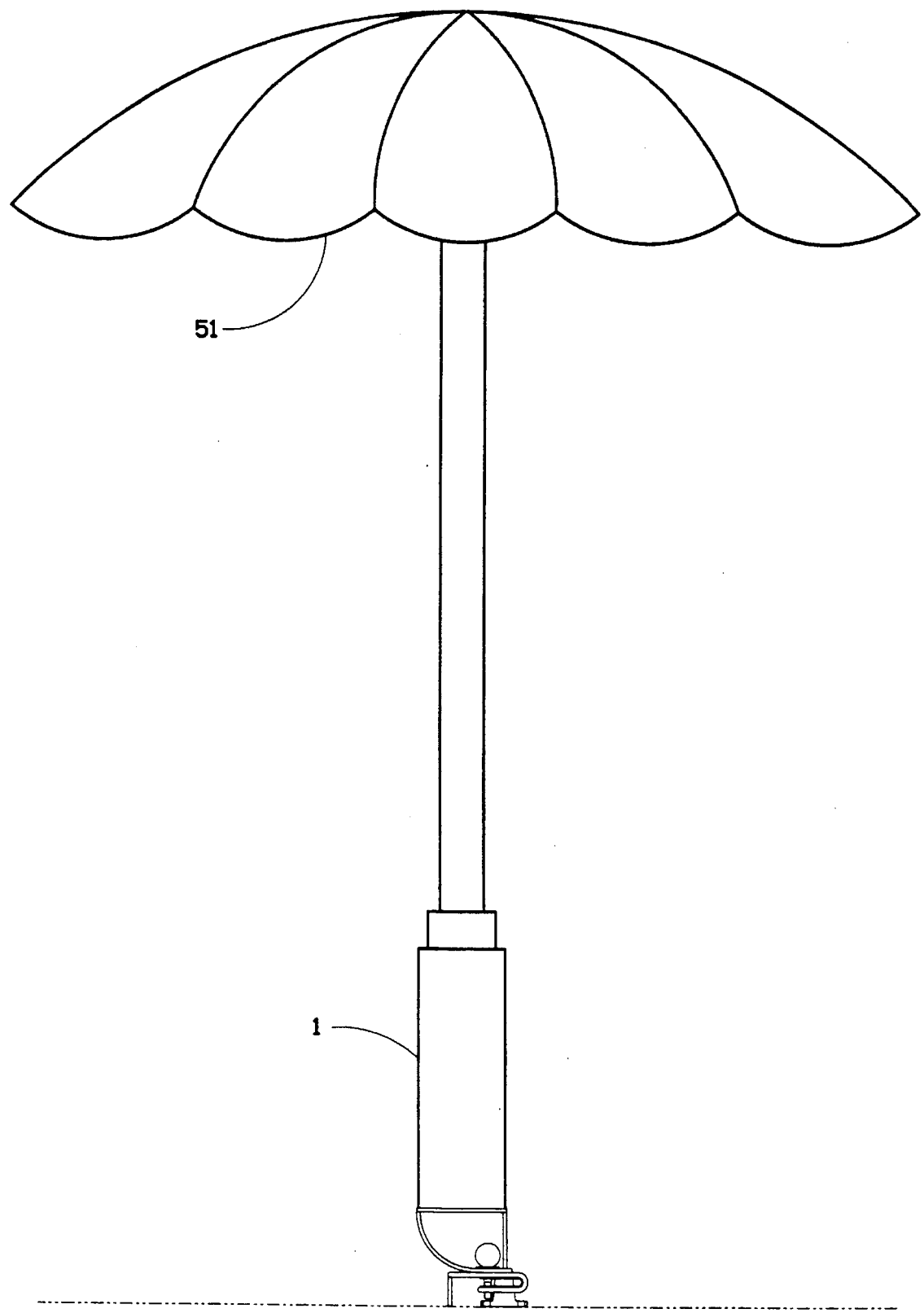
FIG. 20 is an elevation view of the device holding an umbrella.

Referring to FIG. 20 there is shown an elevation view of the device holding an umbrella 51.

Figure 21:
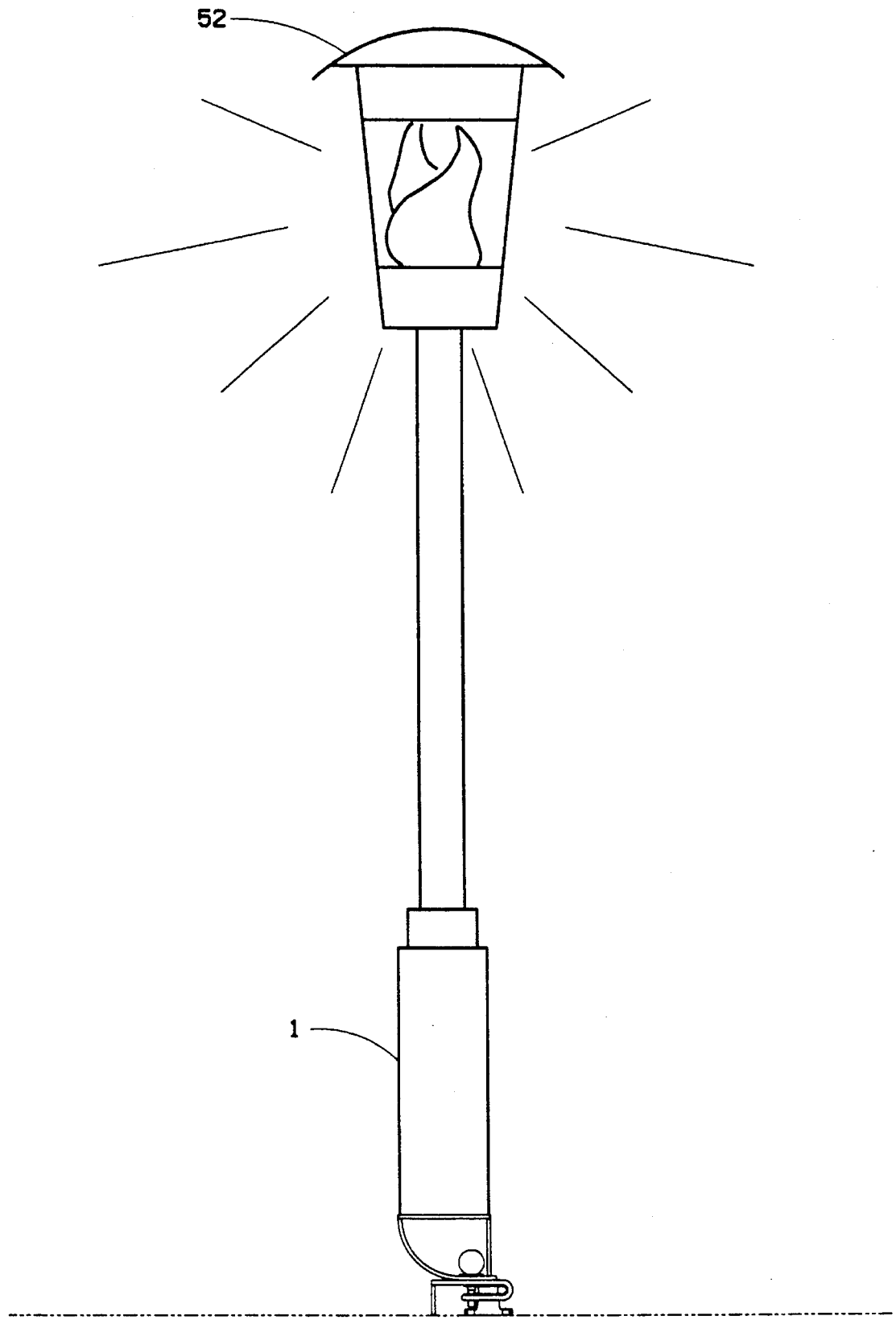
FIG. 21 is an elevation view of the device holding a torch.

Referring to FIG. 21 there is shown an elevation view of the device 1 holding a torch 52.

Figure 22:
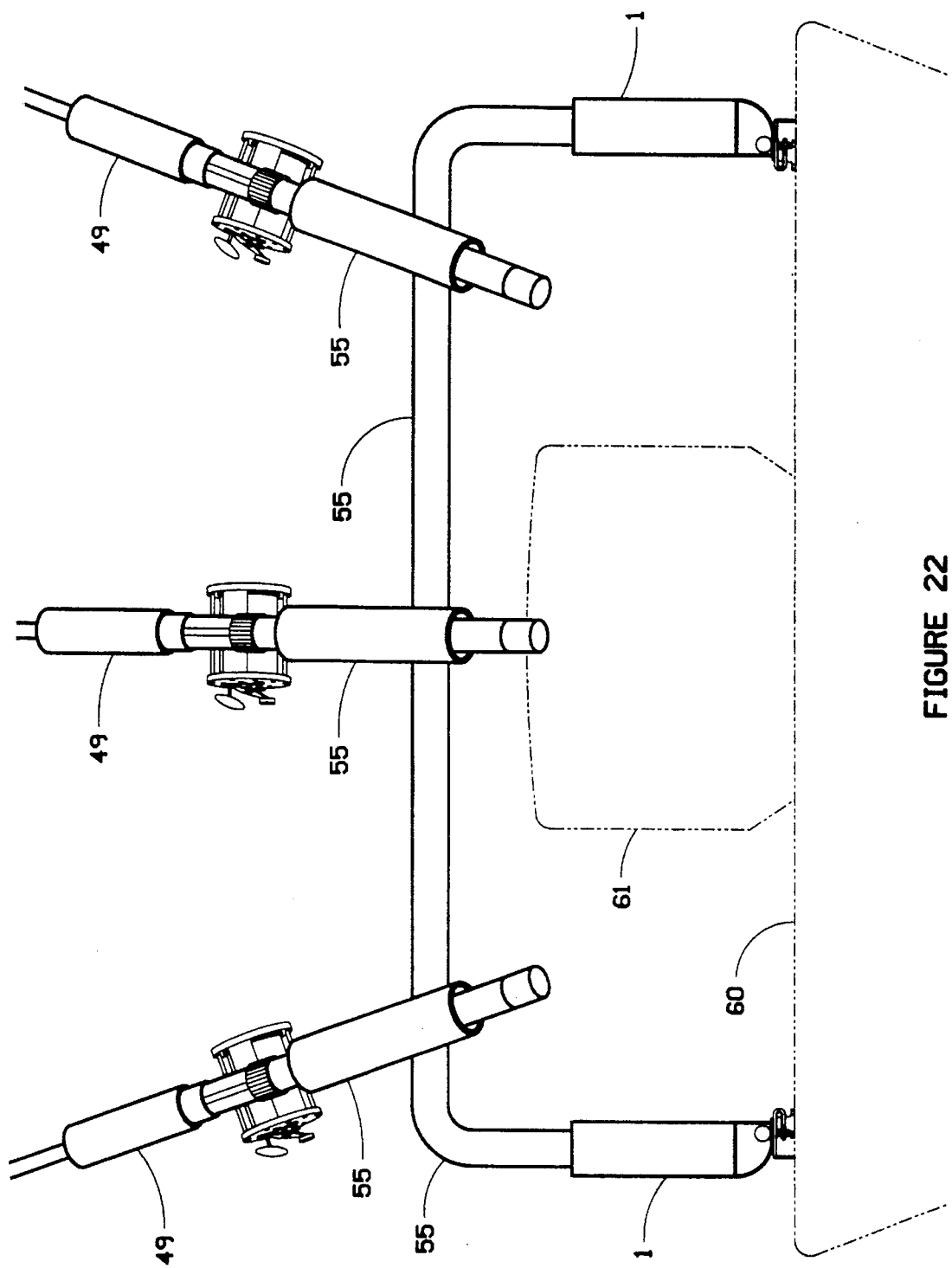
FIG. 22 is an elevation view of the device holding multiple fishing rods.

Referring to FIG. 22 there is shown an elevation view of two devices holding a multiple fishing rod holder 55 with multiple fishing rods 49. On a boat over an outboard motor Although the system described in detail supra has been found to be most satisfactory and preferred, many variations are possible. For example, the device could be fastened to the outside bars of the cleat and not the center of the cleat as shown.

Although the invention has been described with reference to the preferred embodiments it will be understood by those skilled in the art that additions, modifications, substitutions, deletions and other changes not specifically described, may be made in the embodiments herein, it should be understood that the details herein are to be interpreted as illustrative and are not in a limiting sense.

What is claimed as invention is:

1. A device that holds and supports fishing rods, umbrellas, lamps, torches and multiple fishing rod supports bars on at least one cleat mounted on a boat, deck or dock comprising:

a tube, said tube having a first end and a second end;

a pivot support having a first side, a curved second side and a third side wherein said curved second side has a pivot support slot formed in said curved second side and wherein said second end of said tube is fixed to said first side of said pivot support;

a U bar comprised of an elongated bar and a short bar wherein the elongated bar has a first hole formed and said short bar has a threaded second hole with threads formed on said threaded second hole and wherein said U bar is formed essentially in a shape of a U;

a wing bolt with a first end and a second end wherein said wing bolt is comprised of a wing on said first end, a washer and a partially threaded shaft with threads on said second end wherein said threaded shaft is smaller in diameter or section than said pivot support slot, and said threaded shaft is smaller in diameter or section than said first hole formed in said elongated bar and said second end of said threaded shaft is the suitable diameter to be inserted into said threaded second hole wherein said threads of said threaded shaft suitably mesh with said threads of said threaded second hole and wherein said U bar is disposed around said cleat and wherein said wing bolt with said washer is placed in said pivot support slot formed in said curved second side of said pivot support and wherein said shaft of said wing bolt is further inserted into said first hole formed in said elongated bar of said U bar and wherein said threaded shaft of said wing bolt is further inserted into said threaded second hole formed in said short bar of said U bar and wherein said threads on said threaded shaft of said wing bolt are turned in said threaded second hole until said wing bolt and washer are compressed against said curved second side of said pivot support further compressing said pivot support against said U bar support thus locking said pivot support against said tube in a desired angle and direction to further place a said fishing rod, umbrella, lamp, torch or any other desirable device in said tube.

2. The device of claim 1 wherein said U bar with said elongated bar further has a U bar support fixed to said U bar wherein said U bar support touches said boat, deck or dock and prevents said U bar from rotating while said tube is being pulled in an outboard direction.

3. The device of claim 1 wherein the inside of said pivot support has a gnarled surface to cause greater friction between said washer and said pivot support thus preventing said pivot support from turning while under stress.

4. The device of claim 1 wherein said tube can be rotated.

5. The device of claim 1 wherein said tube can be pivoted.

6. A device that holds and supports fishing rods, umbrellas, lamps, torches and multiple fishing rod support bars on a cleat mounted on a boat, dock or deck comprising:

an elongated tube with a first end and a second end;

a pivot support having a first side, a curved second side and a third side wherein adjustment holes are formed in said curved second side of said pivot support and wherein said first side of said pivot support is fixed to said second end of said elongated tube;

an upper plate with a first end a second end a third end and a fourth end wherein a hole is formed in said upper plate;

a back plate with a first end a second end a third end and a fourth end wherein said first end of said back plate is fixed to said second end of said upper plate;

a cleat locking bar with a first end and a second end and with a second hole formed near said second end wherein said second hole has threads formed in said second hole;

a wing bolt and a washer wherein said wing bolt has a first end and a second end and wherein said first end of said wing bolt has a wing gripper to allow the wing bolt to be gripped with fingers and wherein the wing bolt has a shaft wherein said shaft is threaded and wherein said threads will mesh with said threads formed in said second hole and wherein said shaft of said wing bolt is inserted into one adjustment hole formed in said curved second side of said pivot support and said shaft of said wing bolt is further inserted through said first hole formed in said upper plate and said shaft of said wing bolt is inserted into said second hole with threads and said wing bolt is rotated in the desired direction, causing said threaded shaft of said wing bolt to mesh with said threads formed in said second hole until said threaded shaft and said wing bolt pulls against said washer on said curved second side of said pivot support pulling on said cleat locking bar and further bending said cleat locking bar on said cleat further pulling said cleat into said upper plate thus locking said device to said cleat and further providing a device to hold a fishing rod or an umbrella or a lamp or a torch or a multiple fishing rod holding bar on a boat, dock, or deck.

7. The device of claim 6 wherein at least one adjustment support bar is fixed to said back plate comprising;

an adjustment support bar with a first end and a second end and a threaded hole formed near said second end and said first end fixed to said back plate;

a threaded support rod disposed in said threaded hole formed in said adjustment support bar wherein said threaded support rod has a first end and a second end and wherein said first end has a knob formed to allow the threaded support rod to be gripped with fingers and thumb and to be turned, and wherein said second end of said threaded support rod has a pad made out of soft material wherein said knob is turned turning said threaded support rod in said adjustment support bar causing said pad to be pushed into said boat, dock or deck thus releasing some of the rotating load on said cleat.

8. The device of claim 6 wherein said elongated tube fixed to said pivot support may be rotated or pivoted by loosening said wing bolt.

* * * * *